United States Patent [19]

Kohn

[11] Patent Number: 4,991,296
[45] Date of Patent: Feb. 12, 1991

[54] HEDGE TRIMMER

[76] Inventor: Jerry S. Kohn, 26 Paladena Dr., Plainview, N.Y. 11083

[21] Appl. No.: 381,194

[22] Filed: Jul. 18, 1989

[51] Int. Cl.⁵ .................................................. A01G 3/08
[52] U.S. Cl. ..................................... 30/277.4; 30/392; 30/501; 83/835
[58] Field of Search ................. 30/501, 502, 228, 241, 30/253, 208, 209, 272.1, 279.2, 392, 210, 277.4; 56/DIG. 20, 237, 233, 236, 288, 293, 264; 83/830–834, 875, 847, 848, 851, 697, 846

[56] References Cited

U.S. PATENT DOCUMENTS

| | | | |
|---|---|---|---|
| 3,193,925 | 7/1965 | Hawley | 30/210 |
| 4,798,001 | 1/1989 | Grossmann et al. | 30/392 X |
| 4,827,616 | 5/1989 | Sistare | 30/277.4 X |
| 4,893,411 | 1/1990 | Leini | 30/392 X |

Primary Examiner—Douglas D. Watts
Assistant Examiner—Rinaldi Rada
Attorney, Agent, or Firm—Terry M. Gernstein

[57] ABSTRACT

A hedge trimmer includes a blade unit having a plurality of teeth spaced at one spacing from each other and another plurality of teeth spaced at another spacing and distance from the first teeth whereby branches and the like having a variety of sizes can be accommodated by the hedge trimmer.

3 Claims, 3 Drawing Sheets

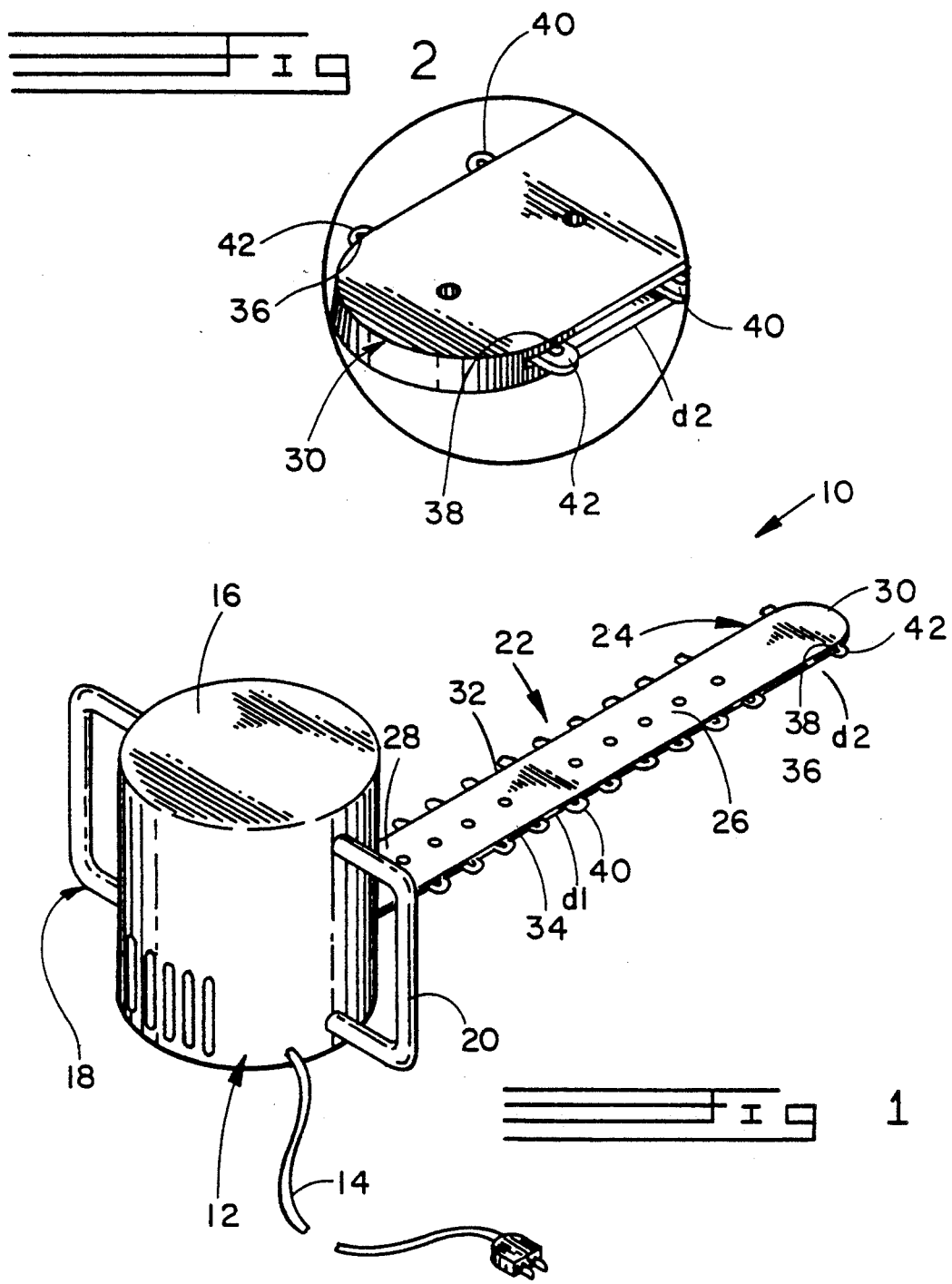

HEDGE TRIMMER

TECHNICAL FIELD OF THE INVENTION

The present invention relates to the general art of hand tools, and to the particular field of hand-held cutting tools. Specifically, the present invention relates to hedge trimmers.

BACKGROUND OF THE INVENTION

Many homeowners trim and shape the hedges, bushes and trees around their homes using a powered trimmer. These trimmers generally include a motor which is drivingly connected to a blade. The blade has a multiplicity of teeth which are moved to cut the hedge, branches, etc.

These powered trimmers work well when all of the branches are essentially the same size, and that size is within the size limits associated with the spacing between the saw blade teeth.

However, if the user has trees and/or hedges with widely varying branch sizes, a single hedge trimmer may prove to be inadequate. For this reason, many homeowners are required to own several trimmers or at least different blades, one with a large number of uniformly and closely spaced teeth for ordinary trimming, and another with teeth spaced apart for large branches. Alternatively, a user may be required to carry a chain saw to accommodate such large branches.

Accordingly, there is a need for a hedge trimmer that is adaptable for use with a wide variety of branch sizes.

OBJECTS OF THE INVENTION

It is a main object of the present invention to provide a hedge trimmer that is a adaptable to a wide variety of branch sizes.

It is another object of the present invention to provide a hedge trimmer having a blade with teeth spaced to accommodate a wide variety of branch sizes.

It is another object of the present invention to provide a hedge trimmer having a blade with teeth spaced at varying distances from each other.

SUMMARY OF THE INVENTION

These, and other, objects are achieved by a hedge trimmer having a blade with teeth spaced from each other on at least two different spacings. One set of teeth are spaced according to the usual branch size, and a second set of the teeth are spaced according to a large branch size. Other embodiments of the device include a plurality of teeth spacings to accommodate a variety of branch sizes.

DESCRIPTION OF THE FIGURES

FIG. 1 is a perspective of the first embodiment of the hedge trimmer embodying the present invention.

FIG. 2 is a perspective of a portion of the hedge trimmer shown in FIG. 1 showing the spacing between several of the teeth.

DETAILED DESCRIPTION OF THE PREFERRED EMBODIMENT OF THE INVENTION

Figure 3:
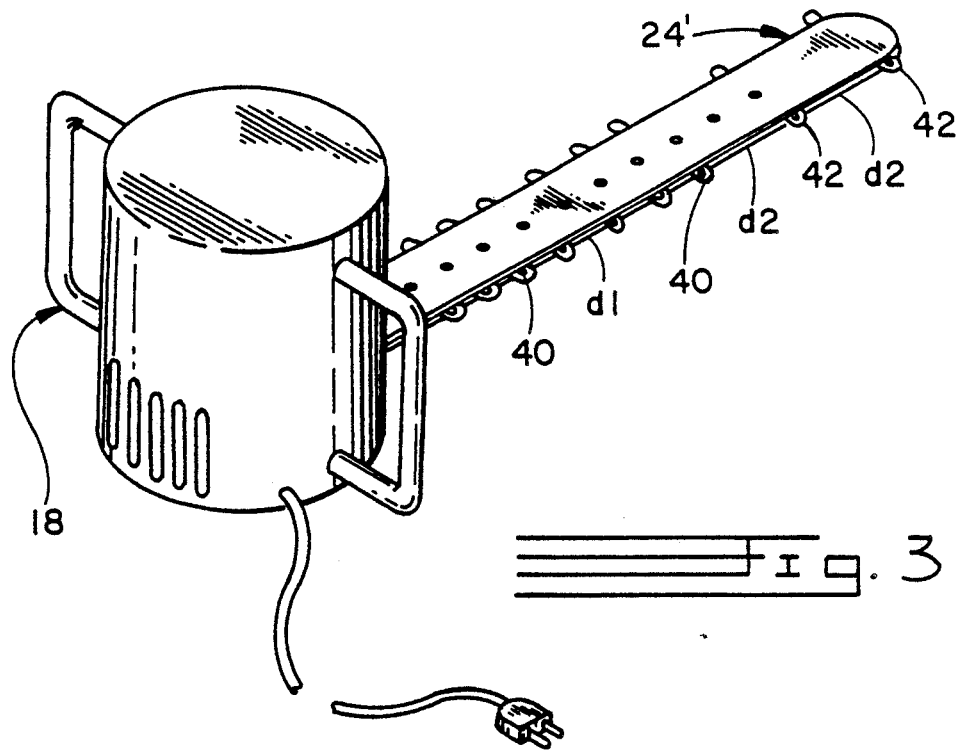
FIG. 3 is a perspective of the second embodiment of the hedge trimmer embodying the present invention.

Shown in FIG. 1 is a hedge trimmer 10 embodying the present invention and which is adapted to cut branches of varying size. The hedge trimmer 10 includes a motor unit 12 which can be an internal combustion engine, or is powered by electricity using a power cord 14 as shown in FIG. 1. The motor unit includes a cylindrical housing 16 having two co-planar handles 18 and 20 on diametrically opposite sides thereof.

A blade unit 22 is mounted on the housing to extend outwardly of the housing and to be oriented essentially perpendicular to the plane containing the handles, and is located essentially midway between such handles.

The blade unit 22 includes a blade 24 having a body 26 with a proximal end 28 connected to the motor housing and a distal end 30 that is curved and is connected to straight sides 32 and 34 at intersection points 36 and 38 respectively.

The blade unit 22 includes a plurality of first teeth 40 that are spaced apart by a first spacing along the sides, as indicated in FIG. 1 by the letter d1. These teeth are used to trim branches and the like that are of the usual and normal size.

However, in order to accommodate larger branches, the blade unit 22 also includes a plurality of second teeth 42 that are spaced from the first teeth by a distance indicated in FIG. 1 as d2. The distance d2 exceeds the distance d1 whereby larger branches can be accommodated, and, in one form of the invention, d2 is three times d1. As indicated in FIG. 1, the preferred embodiment includes two second teeth each located at an intersection 36 and 38. However, as shown in FIG. 3 for a blade unit 24', the blade unit can include additional second teeth 42' that are spaced from the teeth 42 by a distance d2. The additional second teeth 42' are spaced apart from the first teeth 40 by spacing d2".

Figure 4:
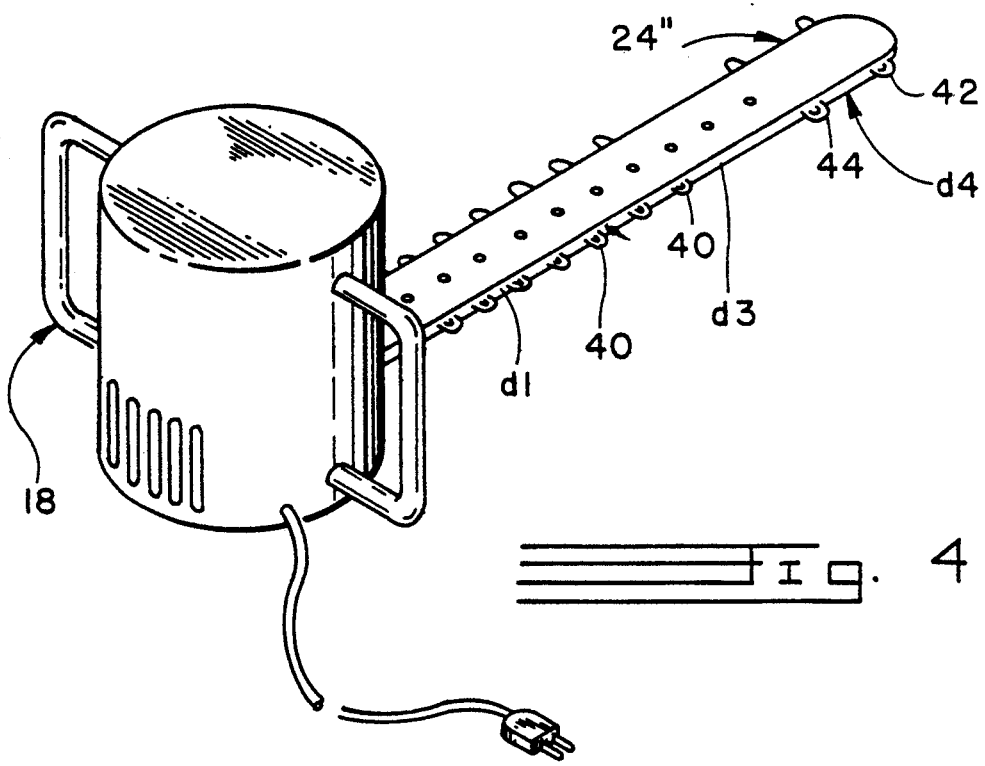
FIG. 4 is a perspective of the third embodiment of the hedge trimmer embodying the present invention.
Figure 5:
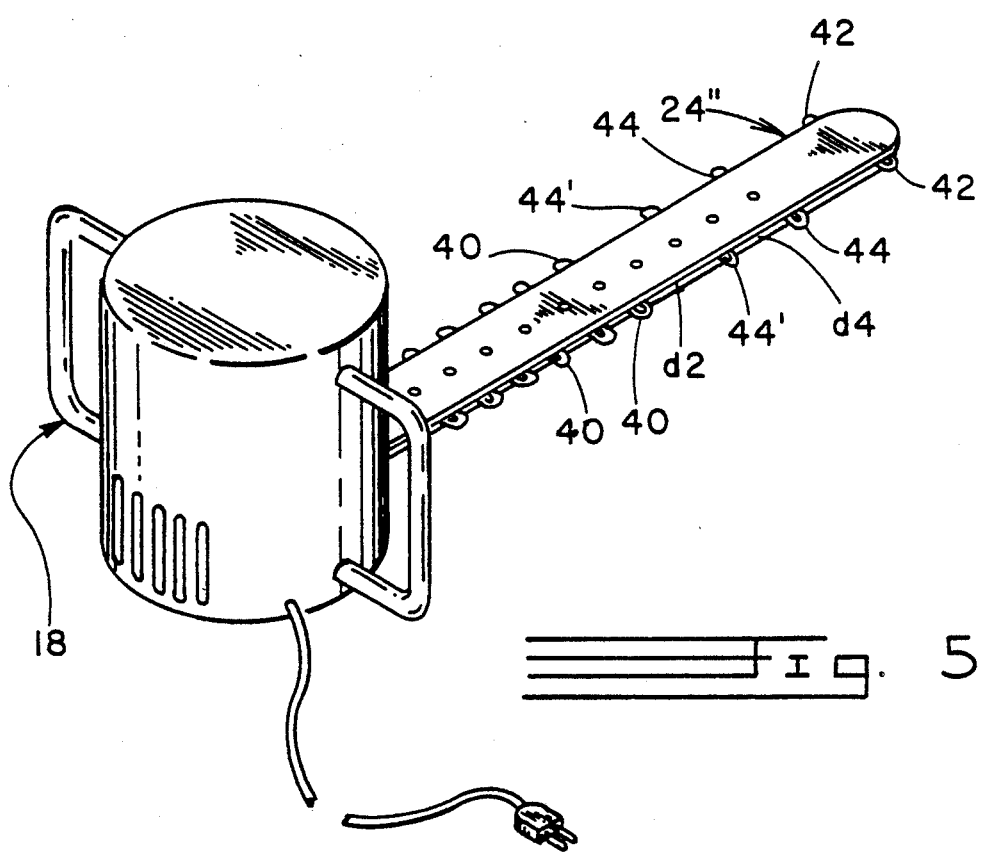
FIG. 5 is a perspective of the fourth embodiment of the hedge trimmer embodying the present invention.

As shown in FIG. 4, an embodiment 24" of the blade unit includes a plurality of third teeth 44 which are spaced from the first teeth 40 by a third distance d3 and from the second teeth 42 by a fourth distance d4. The distance d3 is greater than the distance d1, and the distance d4 is less than the distance d2. In this manner, even more variety in branch size can be accommodated by the blade unit.

A still further embodiment 24''' of the blade unit includes additional third teeth 44' that are spaced from the other third teeth 44 by the fourth distance d4 and from the first teeth 40 by the second distance d2.

It is understood that while certain forms of the present invention have been illustrated and described herein, it is not to be limited to the specific forms or arrangements of parts described and shown.

I claim:

1. A hedge trimmer comprising:
   (A) a motor unit which includes co-planar handles; and
   (B) a blade mounted on said motor unit to be essentially perpendicular to a plane containing said handles and which is located intermediate to said handles, and which includes
      (1) a body having a proximal end connected to said motor unit, a curved distal end and straight side edges connecting said proximal end to said distal end, (2) a plurality of first teeth on said side edges and which are spaced apart from each other by a first distance, (3) a plurality of second teeth on said side edges near said blade distal end and which are spaced apart from said first teeth a second distance which is three times greater than said first distance, two of said second teeth being located at the intersections of said blade body curved distal end and said blade body straight side edges, and (4) a plurality of additional second teeth which are spaced apart from said two second teeth by said second distance.

2. The hedge trimmer defined in claim 1 further including a plurality of third teeth on said side edges and which are spaced apart from said first teeth by a third distance which is greater than said first distance and which are spaced apart from said two second teeth a fourth distance which is less than said second distance.

3. The hedge trimmer defined in claim 2 further including a plurality of additional third teeth with said third teeth and said additional third teeth being spaced apart from each other by said fourth distance.

* * * * *